(12) United States Patent
Marquart et al.

(10) Patent No.: US 11,713,028 B2
(45) Date of Patent: Aug. 1, 2023

(54) APPARATUS AND METHOD FOR OPERATING A BRAKING FORCE GENERATOR

(71) Applicant: Robert Bosch GmbH, Stuttgart (DE)

(72) Inventors: Martin Marquart, Reichenbach (DE); Florian Haag, Ellhofen (DE); Nikolas Loeffelmann, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 16/993,952

(22) Filed: Aug. 14, 2020

(65) Prior Publication Data
US 2021/0101571 A1   Apr. 8, 2021

(30) Foreign Application Priority Data
Oct. 2, 2019   (DE) .......................... 102019215232.5

(51) Int. Cl.
| | |
|---|---|
| *B60T 8/17* | (2006.01) |
| *B60T 7/12* | (2006.01) |
| *B60T 8/171* | (2006.01) |
| *B60T 17/22* | (2006.01) |
| *B60T 13/62* | (2006.01) |

(52) U.S. Cl.
CPC .............. *B60T 8/17* (2013.01); *B60T 7/12* (2013.01); *B60T 8/171* (2013.01); *B60T 13/62* (2013.01); *B60T 17/221* (2013.01); *B60T 2201/03* (2013.01)

(58) Field of Classification Search
CPC combination set(s) only.
See application file for complete search history.

(56) References Cited

U.S. PATENT DOCUMENTS

| | | | |
|---|---|---|---|
| 2016/0221561 A1* | 8/2016 | Leroy | ..................... B60T 17/02 |
| 2018/0326958 A1* | 11/2018 | Petzold | ................. B60T 13/143 |
| 2022/0089170 A1* | 3/2022 | Hu | ......................... B60W 50/04 |

FOREIGN PATENT DOCUMENTS

DE   102009001135 A1   8/2010

\* cited by examiner

*Primary Examiner* — Peter D Nolan
*Assistant Examiner* — Jacob Kent Besteman-Street
(74) *Attorney, Agent, or Firm* — Norton Rose Fulbright US LLP; Gerard Messina

(57) ABSTRACT

A method for operating a braking force generator for a motor vehicle having a hydraulic braking system. The braking force generator, in a first working mode, builds up braking force independently, and in a second working mode, builds up braking force to assist the driver. A strategy for operating the braking force generator is adapted depending on a driving situation. A corresponding apparatus is also provided.

14 Claims, 3 Drawing Sheets

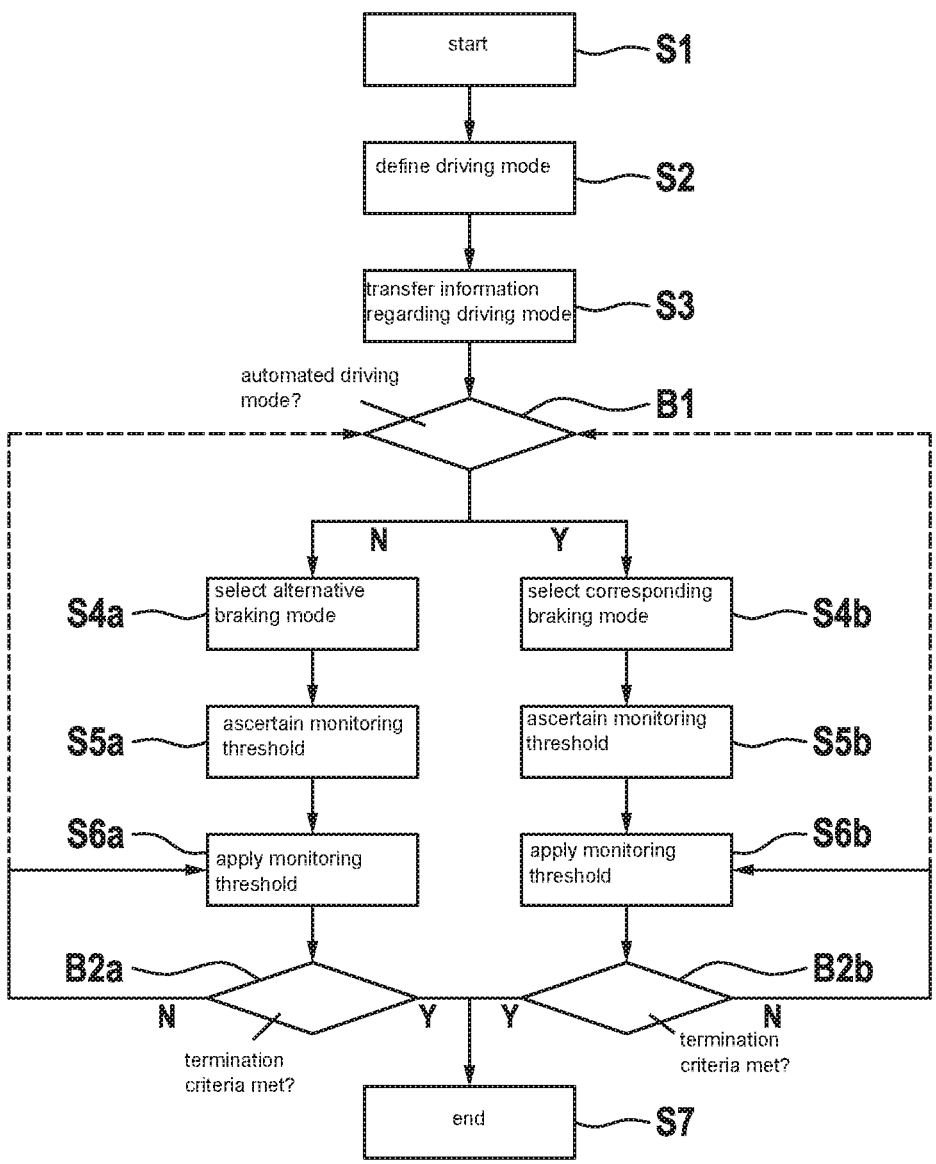

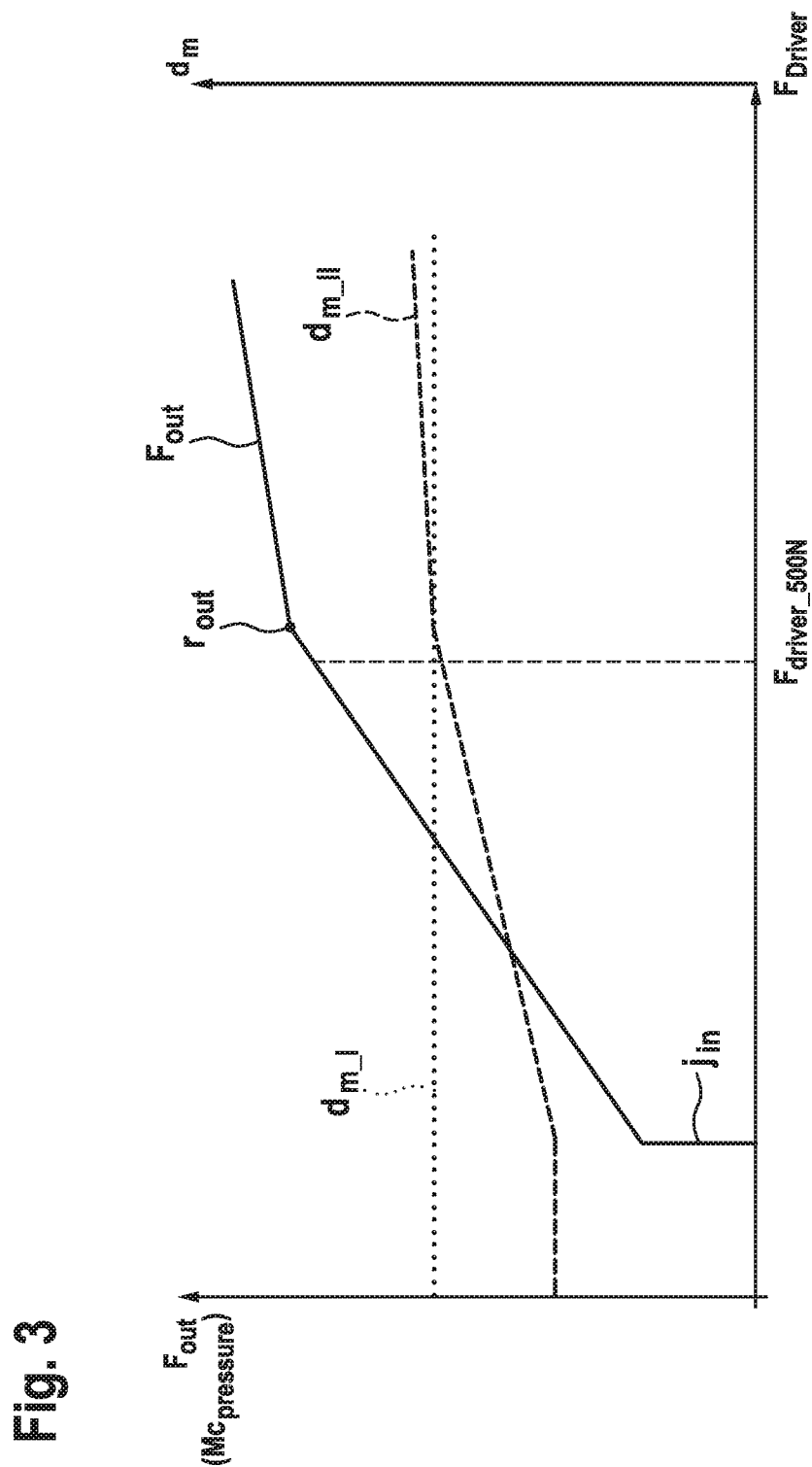

APPARATUS AND METHOD FOR OPERATING A BRAKING FORCE GENERATOR

CROSS REFERENCE

The present application claims the benefit under 35 U.S.C. § 119 of German Patent Application No. DE 102019215232.5 filed on Oct. 2, 2019, which is expressly incorporated herein by reference in its entirety.

FIELD

The present invention relates to a method for operating a braking force generator for a motor vehicle having a hydraulic braking system, the braking force generator in a first working mode building up braking force independently, and in a second working mode building up braking force in support of the driver, which is characterized in that a strategy for operating the braking force generator is adapted depending on a driving situation. A corresponding apparatus is also provided.

BACKGROUND INFORMATION

Vehicles having at least one highly automated or autonomous driving function, which can at least partly take over an actual driving task, are known from the existing art. As a result, the vehicles can drive in highly automated or autonomous fashion by the fact that the vehicles independently recognize, for example, the road ahead, other traffic participants, or obstacles; calculate the corresponding control application instructions in the vehicle; and convey them to the actuators in the vehicle, with the result that the driving behavior of the vehicle is correctly influenced. In a highly automated or autonomous vehicle of this kind, the driver as a rule is not involved in the driving process. Features and means are nevertheless provided which enable the driver him- or herself to engage in the driving process at any time.

Also conventional in the related art are braking systems for vehicles which are designed for control application by a vehicle driver with hydraulic feedthrough. This ensures that, in the event of failure of the braking system, the driver can still apply sufficient braking force onto the wheels of the vehicle by actuating the brake pedal. This design crucially influences the topology of present-day braking systems. For example, the size of a tandem brake master cylinder can be based on maintaining good performance on the fallback level. In addition, the braking systems can be embodied as so-called coupled braking systems or power-assisted braking systems.

Even these systems, however, are implemented in such a way that a hydraulic feedthrough by the driver still exists as a fallback level. Power-assisted braking systems are unsuitable for highly automated or autonomous vehicles, since in them, during an autonomous driving function there is no longer a driver to be assisted, and the braking system must build up the braking energy completely independently.

A method for actuating a hydraulically closed vehicle braking system is described in German Patent Application No. DE 10 2009 001 135 A1. The vehicle braking system encompasses an electromechanical brake booster and a wheel slip regulation system. The vehicle braking system having the brake booster is actuated in situations in which a brake pedal is not actuated, for example in order to limit a vehicle speed or for spacing control with respect to a preceding vehicle, or when parking.

Also in the related art are ECE-R13 and Guideline 98/12/EG. These documents relate to approval guidelines for braking systems in motor vehicles.

Monitoring functions (software functions for fault recognition) of an electrical brake booster are conventionally parameterized in vehicle-specific fashion; faults in the product must be recognized within a delay range (defined via ECE-R13) and must result in a corresponding substitute reaction. One boundary condition in the context of parameterization is, for example, a defined brake pedal force (500 N) built up by the vehicle driver. Generally, the parameterization of the monitoring functions is calculated in consideration of that defined brake pedal force.

SUMMARY

In specific driving situations, however, a different brake pedal force, or in fact none, in fact exists, for example in a context of autonomous driving or braking. The robustness of the monitoring functions, for instance with respect to changes in temperature, aging, etc., is decreased when monitoring thresholds are calculated in consideration of a brake pedal force that is not present (to the stipulated extent). The availability of the product is thereby also reduced. A method and apparatus according to example embodiments of the present invention, conversely, advantageously allow an increase in the availability of a braking system, and thus an increase in availability for the vehicle.

The present invention makes this possible by way of the features described herein. Further embodiments of the present invention are described herein.

A method according to an example embodiment of the present invention for operating a braking force generator for a motor vehicle having a hydraulic braking system, the braking force generator in a first working mode building up braking force independently, and in a second working mode building up braking force to assist the driver, is characterized in that a strategy for operating the braking force generator is adapted depending on a driving situation.

A "braking force generator" of this kind is to be understood as any braking force generator that can both independently build up braking force as an external-force brake and, as a brake booster, can intensify a pressure specified by the driver. Reference may be made in this regard, for example, to the so-called iBooster of Robert Bosch GmbH. The present invention is not limited to such a system, however, and can analogously encompass any other implementation, for example pneumatic or hydraulic braking force generators.

A "strategy for operating a braking force generator" can be understood as any adjustable control and/or any predefinable behavior of the braking force generator. Examples that may be recited are: pedal characteristics (e.g., for feedback to the driver), braking characteristics (e.g., dynamics of brake pressure buildup), etc.

A strategy for fault detection of the braking force generator can also be understood, for example, as a strategy for operating a braking force generator. A strategy for fault detection implemented in a software function is referred to in this context as a "monitoring function." This is understood to mean that a software function for fault detection can be adapted during operation of the motor vehicle. Advantageously, provision is made in particular that specific thresholds can be adapted in the context of the monitoring function. The adaptation is effected based on factors that are described as a "driving situation." This can involve both external factors (e.g. temperature, coefficients of friction, etc.) and internal factors (e.g., autonomous/manual operating mode of the motor vehicle). The present invention can advantageously be used to perform a dynamic adaptation of functional monitoring thresholds depending on the current driving situation of the vehicle. As a result, the parameters that are more suitable for the respective driving situation, and thus are more robust, can be used for the electrical brake booster, thereby minimizing the probability of an erroneous degradation of the braking system components.

In an advantageous embodiment of the present invention, the method includes that a parameterization of an operating function is modified upon adaptation of the strategy for operating the braking force generator.

This is understood to mean that the strategy for operating the braking force generator is adapted during operation of the motor vehicle, and in consideration of and depending on the driving situation. For example, the strategy for fault detection is adapted, the parameterization of a fault detection function being modified in that context. Advantageously, the intention is thereby to improve the validity of fault detection and thereby increase the availability of the system.

In a preferred embodiment of the present invention, the method includes that at least one value of a parameter of a parameterization of an operating function is adapted in accordance with the respective driving situation.

This is understood to mean that, for example, one or several parameters of the monitoring function are modified situationally. It is of course also possible for all parameters to be adapted in accordance with the situation that exists.

In an alternative refinement of the present invention, the method is characterized in that at least one value of a parameter of a parameterization of an operating function is selected from a stored data set.

This is understood to mean that, for example, one or several parameters of the monitoring function are modified situationally, the parameters that correspond to, or are suitable for, the respective driving situation being read out from a stored data set. In addition, the selected parameters are utilized and used correspondingly in the context of the current monitoring function. It is of course also possible not only for individual parameters of a parameterization to be stored and read out, but also for entire parameterizations for the fault detection function to be stored and read out.

In an advantageous embodiment of the present invention, the method includes that at least one value of a parameter of a parameterization of an operating function is calculated.

This is understood to mean that, for example, one or several parameters of the monitoring function are modified situationally, the parameters that correspond to, or are suitable for, the respective driving situation being calculated situationally. It is of course also possible for all parameters to be calculated in accordance with the situation that exists.

In a possible embodiment of the present invention, the method includes that the working mode of the braking force generator is taken into consideration as a driving situation, consideration being given in particular to whether, in the situation that exists, the braking force generator is generating braking force independently or is generating braking force to assist the braking force of the driver.

In a preferred refinement of the present invention, the method includes that the working mode of the braking force generator is taken into consideration as a driving situation, consideration being given in particular to whether, in the situation that exists, the braking force generator is building up braking force independently or is building up braking force to assist the driver.

In an alternative embodiment of the present invention, the method includes that information regarding the driving situation is transferred via a normal bus system.

This is understood to mean that a bus system already present in the motor vehicle is used in order thereby also to transfer information regarding the driving situation that exists. This could be, for example, an existing bus line and bus communication between a central control device of the automated driving and the control device of the braking force generator.

In a preferred embodiment of the present invention, the method includes that at least a first and a second parameterization of a fault detection function of the braking force generator are embodied, and at least a first and a second driving situation are defined, the first parameterization being selected upon detection of the first driving situation, and the second parameterization being selected upon detection of the second driving situation.

In an advantageous embodiment of the present invention, the method includes that the strategy for operating the braking force generator is embodied as a strategy for fault detection of the braking force generator, a parameterization of a fault detection function in particular being modified upon adaptation of the strategy for fault detection.

In a possible embodiment of the present invention, the method includes that upon adaptation of the strategy for fault detection, a parameterization of a fault detection function is determined in such a way that a fault detection function that is maximally robust for the respective driving situation is achieved.

This is understood to mean that the parameters that are most robust for the driving mode are established for monitoring the braking force generator. This is furthermore to be understood to mean that, for example, when several options for parameterization exist, the one that exhibits the greatest robustness for the situation that exists is selected.

In a possible embodiment of the present invention, the method includes that at least a first and a second parameterization of a fault detection function of the braking force generator are embodied, a first monitoring threshold for detecting a fault without consideration of a pedal force of the driver being defined in the context of the first parameterization, and a second monitoring threshold for detecting a fault with consideration of a specific pedal force of the driver being defined in the context of the second parameterization.

This method can be implemented, for example, in software or hardware or in a mixed form of software and hardware, for example in a control device.

The present invention described herein furthermore provides an apparatus that is embodied to carry out, control, and implement the steps of a variant of a method presented here in corresponding devices. This variant embodiment of the present invention in the form of an apparatus also allows the object on which the present invention is based to be quickly and efficiently achieved.

A "apparatus" can be understood in the present case as an electrical device that processes sensor signals and outputs control signals and/or data signals as a function thereof. The apparatus can have an interface that can be embodied as hardware and/or software. In a hardware-based embodiment, for example, the interfaces can be part of a so-called system ASIC that contains a wide variety of functions of the apparatus. It is also possible, however, for the interfaces to be dedicated integrated circuits, or to be made up at least in part of discrete components. In the context of a software-based embodiment, the interfaces can be software modules that are present, for example, on a microcontroller alongside other software modules.

An "apparatus" can furthermore be understood as a control device, in particular a control device for actuating the braking force generator and/or a control device for executing the automated driving function. An "apparatus" is also understood as a braking force generator that is configured to execute the method. A vehicle having a braking force generator for executing the method is, of course, also understood as an "apparatus." A vehicle that can be operated in both automated and driver-driven fashion is especially to be understood in that sense.

Also advantageous is a computer product or computer program having program code that can be stored on a machine-readable medium or memory medium such as a semiconductor memory, a hard-drive memory, or an optical memory, and is used to carry out, implement, and/or control the steps of the method in accordance with one of the embodiments described herein, in particular when the program product or program is executed on a computer or an apparatus.

Be it noted that the features set forth individually in the description can be combined with one another in any technically appropriate manner, and indicate further embodiments of the present invention. Further features and useful aspects of the present invention are evident from the description of exemplifying embodiments with reference to the figures.

BRIEF DESCRIPTION OF THE DRAWINGS

FIG. 2 depicts method steps for adapting the parameterization, according to an example embodiment of the present invention.

FIG. 3 depicts various curves for functional monitoring thresholds.

DETAILED DESCRIPTION OF EXAMPLE EMBODIMENTS

Figure 1:
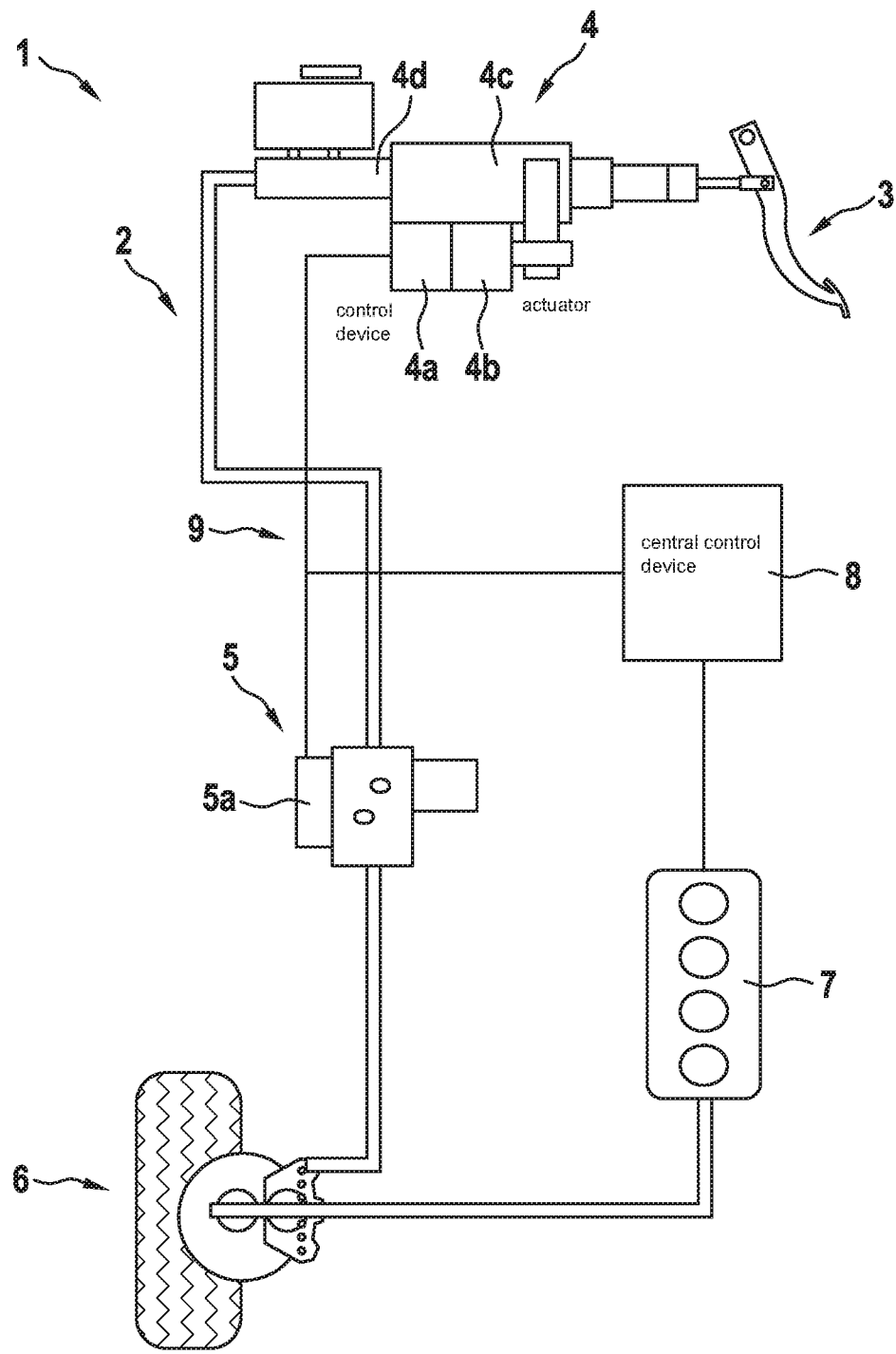
FIG. 1 schematically depicts a vehicle having a braking force generator according to an example embodiment of the present invention.

FIG. 1 schematically depicts a vehicle having an electromechanical braking force generator according to an embodiment of the present invention. Motor vehicle 1 is depicted merely indirectly via a few components, for example propulsion engine 7 and a vehicle wheel having a wheel brake 6. Also among the components depicted is hydraulic braking system 2. A braking request of the driver can be inputted via a brake pedal 3. A braking force generator 4 is also shown. Braking force generator 4 is designed, as a external-force brake, to independently generate a braking force irrespective of the driver. Braking force generator 4 is furthermore designed, as a servo brake, to assist a braking force of the driver. Braking force generator 4 encompasses a control device 4a for control. Braking force generator 4 furthermore encompasses an actuator 4b (for example, an electric motor) for generating the braking force. Braking force generator 4 also encompasses a transfer apparatus 4c (for example, a spindle linkage) for transferring the generated force. The transfer apparatus can also contain a combination module for combining the force inputted via brake pedal 3 and the force generated by way of actuator 4b. By way of the force, for example, a piston is displaced. A brake master cylinder 4d (in particular, a tandem brake master cylinder) is also provided. Here, for example, the aforementioned piston displacement is converted into a fluid displacement or a buildup of brake pressure. Hydraulic braking system 2 can furthermore include a modulation unit 5 that modulates, as required, the hydraulic pressure existing in the system. Modulation unit 5 can have a separate control device 5a. Also depicted is a central control device 8 that, for example, controls an automated driving function for the motor vehicle.

FIG. 2 depicts the method steps for adapting the parameterization, according to an example embodiment of the present invention. In a first step S1, the method is started. In a second step S2, the driving mode for the vehicle, for example automated driving, is defined. This can be activated, for example, manually by the driver. In step S3, the information regarding the driving mode is transferred. The data can be transferred by way of an existing bus communication system. The data are furthermore loaded into the control device of the braking force generator. A check can then be made, in a condition B1, as to whether an automated driving mode exists. If so (Y branch), the corresponding braking mode is selected, for example selection of a highly automated driving (HAD) mode in a step S4b. In a following step S5b, a monitoring threshold for automated driving is ascertained. The corresponding monitoring threshold is, for example, read out from a database. In a following step S6b, the ascertained monitoring threshold is applied and used in fault checking. A condition B2b furthermore checks whether a termination criterion for the method has been met. If so (Y branch), the method is terminated in a step S7. If not (N branch), step S6b continues to be executed. In that case it is also possible to check at defined points in time (or also continuously) whether condition B1 is still being met (dashed line). If condition B1 is not met, originally or at a later point in time (N branch), then in step S4a the corresponding alternative braking mode, e.g. for driver-assisting braking, is selected. In a following step S5a, a monitoring threshold for driver-determined driving is ascertained. For example, the corresponding monitoring threshold is read out from a database. In a following step S6a, the ascertained monitoring threshold is applied and used in the context of fault checking. A condition B2a then checks whether a termination criterion for the method has been met, with consequences analogous to those with regard to condition B2b already described.

FIG. 3 furthermore depicts several curves for various functional monitoring thresholds. The Figure shows on the one hand, with a solid line, a pressure curve for brake master cylinder $F_{out}$ (left Y axis), which is plotted against the driver braking force $F_{Driver}$ (X axis). The "jump-in" point $j_{in}$ and the "run-out" point $r_{out}$ are explicitly plotted here. Also labeled is the point ($F_{driver\_500N}$) at which the driver force is equal to 500 N. Two further graphs are additionally shown. The first is the dotted line $d_{m\_I}$ that depicts an average vehicle deceleration having a value of 6.43 m/s². This corresponds to the setpoint for the desired target deceleration. According to the related art, this is constant over the entire curve. This variable is constant even in different driving situations. FIG. 3 furthermore shows a dashed line $d_{m\_II}$ that depicts an adapted average vehicle deceleration. The actually effective driver pedal force is taken into consideration in ascertaining this variable. The curve of the graph accordingly changes. The characterizing variable $d_{m\_II}$ is utilized in the context of defining the parameterization for fault detection. The parameterization is also correspondingly adapted depending on the respective driving situation. For example, the parameterization is adapted depending on the selected driving mode (automated driving versus normal driving). The parameterization can also be adapted depending on the actual currently effective driver braking force, as shown above.

What is claimed is:

1. A method for operating a braking force generator for a motor vehicle including a hydraulic braking system, the method comprising the following steps:
   in a first working mode of the brake force generator, building up, by the braking force generator, a braking force independently;
   in a second working mode of the brake force generator, building up, by the braking force generator, the braking force to assist a driver of the motor vehicle; and
   adapting a strategy for operating the braking force generator depending on a driving situation,
   wherein the strategy for operating the braking force generator is a strategy for fault detection of the braking force generator,
   wherein at least a first parameterization and a second parameterization of a fault detection function of the braking force generator are provided, and at least a first driving situation and a second driving situation are defined, the first parameterization being selected upon detection of the first driving situation, and the second parameterization being selected upon detection of the second driving situation.

2. The method as recited in claim 1, wherein a parameterization of an operating function is modified upon adapting the strategy for operating the braking force generator.

3. The method as recited in claim 1, wherein at least one value of a parameter of a parameterization of an operating function is adapted in accordance with the driving situation.

4. The method as recited in claim 1, wherein at least one value of a parameter of a parameterization of an operating function is selected from a stored data set.

5. The method as recited in claim 1, wherein at least one value of a parameter of a parameterization of an operating function is calculated.

6. The method as recited in claim 1, wherein a driving mode of the motor vehicle is taken into consideration as the driving situation, consideration being given to whether, in the driving situation, the motor vehicle is being controlled by the driver or whether the motor vehicle is driving automatically.

7. The method as recited in claim 1, wherein a working mode of the braking force generator is taken into consideration as the driving situation, consideration being given to whether, in the driving situation, the braking force generator is generating braking force independently or is generating braking force to assist the driver.

8. The method as recited in claim 1, wherein information regarding the driving situation is transferred via a normal bus system.

9. The method as recited in claim 1, wherein at least a first parameterization and a second parameterization of an operating function of the braking force generator are provided, and at least a first driving situation and a second driving situation are defined, the first parameterization being selected upon detection of the first driving situation, and the second parameterization being selected upon detection of the second driving situation.

10. A method for operating a braking force generator for a motor vehicle including a hydraulic braking system, the method comprising the following steps:
    in a first working mode of the brake force generator, building up, by the braking force generator, a braking force independently;
    in a second working mode of the brake force generator, building up, by the braking force generator, the braking force to assist a driver of the motor vehicle; and
    adapting a strategy for operating the braking force generator depending on a driving situation,
    wherein the strategy for operating the braking force generator is a strategy for fault detection of the braking force generator, a parameterization of a fault detection function being modified upon adaptation of the strategy for fault detection.

11. The method as recited in claim 10, wherein upon adaptation of the strategy for fault detection, a parameterization of a fault detection function is determined in such a way that a fault detection function that is maximally robust for the respective driving situation is achieved.

12. The method as recited in claim 10, wherein at least a first parameterization and a second parameterization of the fault detection function of the braking force generator are provided, a first monitoring threshold for detecting a fault without consideration of a pedal force of the driver being defined in the context of the first parameterization, and a second monitoring threshold for detecting a fault with consideration of a specific pedal force of the driver being defined in the context of the second parameterization.

13. An apparatus for a motor vehicle including a hydraulic braking system, the apparatus configured to:
    in a first working mode, build up a braking force independently;
    in a second working mode, build up the braking force to assist a driver of the motor vehicle; and
    adapt a strategy for operating the braking force generator depending on a driving situation,
    wherein the strategy for operating the braking force generator is a strategy for fault detection of the braking force generator, a parameterization of a fault detection function being modified upon adaptation of the strategy for fault detection.

14. A non-transitory computer-readable storage medium on which is stored a computer program for operating a braking force generator for a motor vehicle including a hydraulic braking system, the computer program, when executed by a computer, causing the computer to perform the following steps:
    in a first working mode of the brake force generator, building up, by the braking force generator, braking force independently;
    in a second working mode of the brake force generator, building up, by the braking force generator, the braking force to assist a driver of the motor vehicle; and
    adapting a strategy for operating the braking force generator depending on a driving situation,
    wherein the strategy for operating the braking force generator is a strategy for fault detection of the braking force generator, a parameterization of a fault detection function being modified upon adaptation of the strategy for fault detection.

* * * * *